(12) United States Patent
Miyazawa

(10) Patent No.: US 9,175,754 B2
(45) Date of Patent: Nov. 3, 2015

(54) CHAIN GUIDE

(71) Applicant: TSUBAKIMOTO CHAIN CO., Osaka-shi, Osaka (JP)

(72) Inventor: Toshihiko Miyazawa, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 44 days.

(21) Appl. No.: 14/080,044

(22) Filed: Nov. 14, 2013

(65) Prior Publication Data

US 2014/0148288 A1 May 29, 2014

(30) Foreign Application Priority Data

Nov. 29, 2012 (JP) ................. 2012-261211

(51) Int. Cl.
*F16H 7/08* (2006.01)
*F16H 7/18* (2006.01)

(52) U.S. Cl.
CPC .......... *F16H 7/18* (2013.01); *F16H 2007/0872* (2013.01)

(58) Field of Classification Search
CPC ..... F16H 2007/0872; F16H 7/18; F16H 7/08; F16H 2007/0804; F16H 2007/185
USPC ................................. 474/111, 140
See application file for complete search history.

(56) References Cited

U.S. PATENT DOCUMENTS

| | | | | |
|---|---|---|---|---|
| 4,395,251 A * | 7/1983 | King et al. | ..................... | 474/111 |
| 4,642,073 A * | 2/1987 | Ancarani Restelli | ......... | 474/111 |
| 5,000,724 A * | 3/1991 | Reid | ............................ | 474/111 |
| 5,286,234 A * | 2/1994 | Young | ......................... | 474/111 |
| 5,318,482 A * | 6/1994 | Sato et al. | ..................... | 474/111 |
| 5,425,680 A * | 6/1995 | Young | ......................... | 474/111 |
| 6,036,613 A * | 3/2000 | Diehm | ......................... | 474/111 |
| 6,412,464 B1 | 7/2002 | Schneider et al. | | |
| 6,852,051 B2 * | 2/2005 | Konno | .......................... | 474/111 |
| 7,476,168 B2 * | 1/2009 | Markley et al. | ............... | 474/111 |
| 7,967,708 B2 * | 6/2011 | Hayami et al. | ............... | 474/111 |
| 8,007,385 B2 * | 8/2011 | Hirayama et al. | ............ | 474/111 |
| 8,617,012 B2 * | 12/2013 | Young et al. | .................. | 474/111 |
| 8,672,785 B2 * | 3/2014 | Young | ......................... | 474/111 |
| 8,690,717 B2 * | 4/2014 | Fuhrmann et al. | ........... | 474/111 |
| 8,900,079 B2 * | 12/2014 | Mori et al. | .................... | 474/140 |
| 2002/0061799 A1 * | 5/2002 | Young | ......................... | 474/111 |
| 2002/0128100 A1 * | 9/2002 | Inoue et al. | .................... | 474/111 |
| 2003/0040385 A1 * | 2/2003 | Konno | ......................... | 474/111 |
| 2004/0005952 A1 * | 1/2004 | Bachmair | ..................... | 474/111 |
| 2004/0147350 A1 * | 7/2004 | Kurohata et al. | ............ | 474/111 |

(Continued)

FOREIGN PATENT DOCUMENTS

| | | |
|---|---|---|
| JP | 2001-153199 A | 6/2001 |
| JP | 2009-085412 A | 4/2009 |
| WO | 2009/044606 A1 | 4/2009 |

*Primary Examiner* — Henry Liu
(74) *Attorney, Agent, or Firm* — Westerman, Hattori, Daniels & Adrian, LLP

(57) ABSTRACT

There is provided a chain guide capable of improving rigidity and durability without enlarging its structure to the side opposite to a chain travel surface with a simple configuration, and reducing the size of a guide shoe without increasing the number of components to thereby lower manufacturing cost. The chain guide includes the guide shoe and a guide body that supports the guide shoe, and the guide body has support wall portions that are provided near at least one side of both sides of the guide shoe in a width direction thereof so as to extend to the side of a chain at least at one position.

2 Claims, 6 Drawing Sheets

(56) References Cited

U.S. PATENT DOCUMENTS

| | | | |
|---|---|---|---|
| 2005/0277506 A1* | 12/2005 | Konno | 474/111 |
| 2007/0021251 A1* | 1/2007 | Redaelli et al. | 474/109 |
| 2007/0037646 A1* | 2/2007 | Markley et al. | 474/111 |
| 2007/0037647 A1* | 2/2007 | Markley et al. | 474/111 |
| 2009/0036242 A1* | 2/2009 | Hayami et al. | 474/111 |
| 2011/0105259 A1* | 5/2011 | Fuhrmann | 474/111 |
| 2011/0294613 A1* | 12/2011 | Fuhrmann et al. | 474/111 |
| 2012/0052997 A1* | 3/2012 | Young | 474/111 |
| 2013/0095965 A1* | 4/2013 | Nakagawa et al. | 474/111 |
| 2013/0210566 A1* | 8/2013 | Konno | 474/111 |
| 2014/0057749 A1* | 2/2014 | Konno et al. | 474/111 |

* cited by examiner

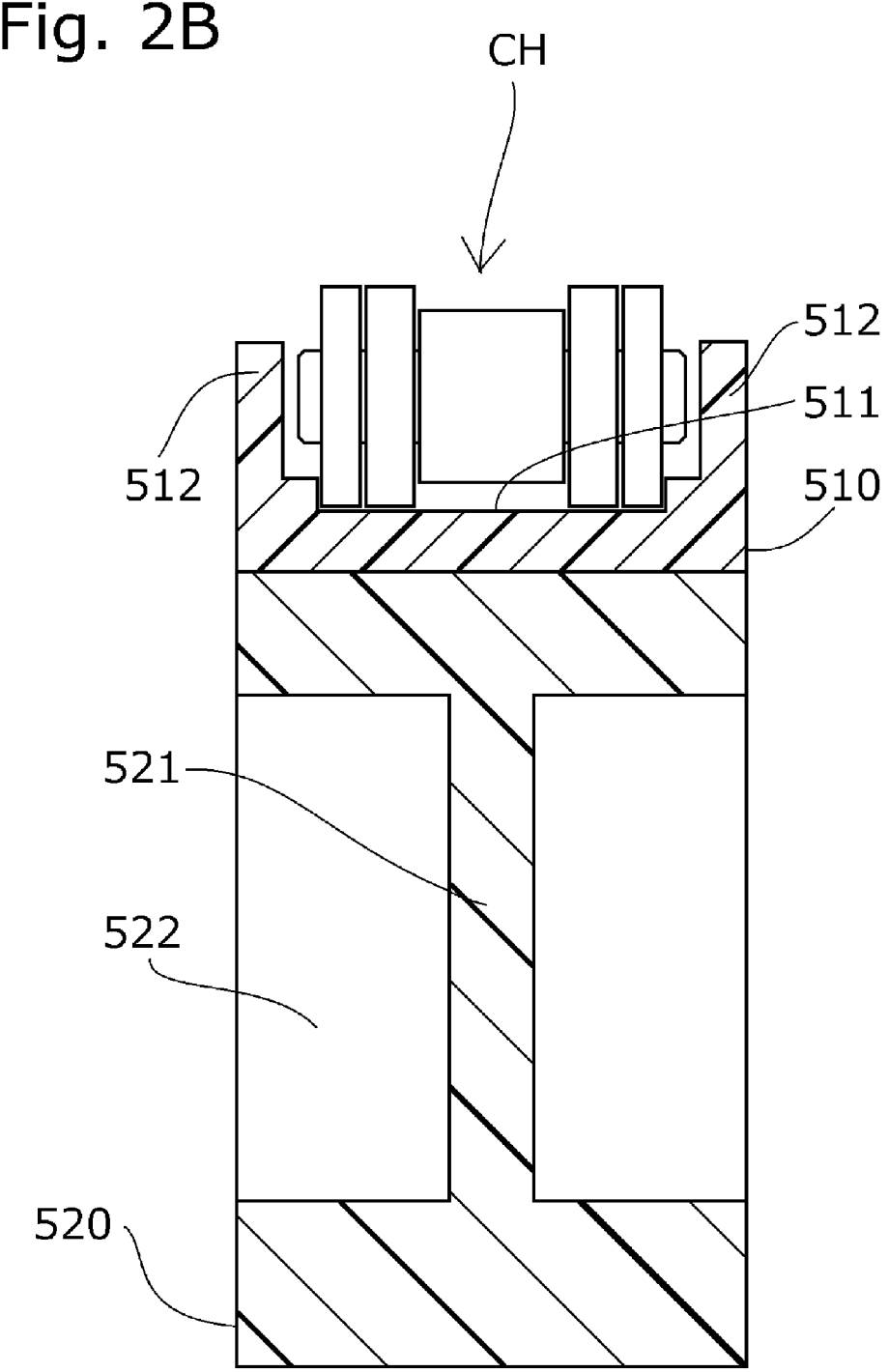

RELATED ART

RELATED ART

RELATED ART

CHAIN GUIDE

BACKGROUND OF THE INVENTION

1. Field of the Invention

The present invention relates to a chain guide including a guide shoe that slidably guides a traveling chain and a guide body that supports the guide shoe along the direction of travel of the chain.

2. Description of the Related Art

Conventionally, a chain guide including a guide shoe that slidably guides a traveling chain is commonly used in order to stabilize the chain traveling between sprockets and properly maintain tension.

For example, as shown in FIG. 5, there is known a timing system of an engine that causes a transmission chain CH such as a roller chain or the like endlessly wound between sprockets S1 and S2 provided at a crankshaft and a camshaft in an engine room E to travel in which the timing chain CH is endlessly wound between the driving sprocket S1 attached to the crankshaft in the engine room E and a pair of the driven sprockets S2 attached to the camshaft, and the timing chain CH is guided by a pivoting chain guide (pivoting guide) 500 and a chain guide (fixed guide) 600.

In this known timing system, the fixed guide 600 is fixed in the engine room E with two mounting shafts Q, while the pivoting guide 500 is mounted in the engine room E so as to be pivotable about a pivot P in the plane of winding of the timing chain CH.

A chain tensioner T presses the pivoting guide 500 to thereby properly maintain the tension of the timing chain CH and suppress vibrations.

As shown in FIGS. 2B, 6, and 7, the known chain guide (pivoting guide) 500 used in such a timing system includes a guide shoe 510 and a guide body 520, and the guide body 520 has a pivoting boss portion 523 pivotably supported via a support wall portion 521 that extends to the side opposite to a chain travel surface 511, and a pressed portion 524 that is pressed to the side of the chain by the tensioner T.

In addition, in the support wall portion 521, a reinforcing rib 522 in an appropriate shape is provided at an appropriate interval in an appropriate direction, and the rigidity of the guide body 520 is thereby enhanced.

At both sides of the chain travel surface 511 of the guide shoe 510, lips 512 that protrude to the side of the chain are provided in order to prevent the detachment of the chain in a width direction.

The chain travel surface of the guide shoe 510 slides relative to the chain and the temperature of the chain travel surface is increased to a high temperature, and hence it is necessary to have a predetermined distance between the guide shoe 510 and the pivoting boss portion 523 in order to prevent the deformation of the pivoting boss portion 523 by heat, the enlargement of a gap with the pivot P, and the generation of vibrations or the like.

In addition, a large force is applied to the pressed portion 524 that is pressed to the side of the chain by the chain tensioner T, and hence the pressed portion 524 is configured such that the rigidity thereof is enhanced by having a long distance to the guide shoe 510 (see Japanese Patent Application Laid-open No. 2001-153199).

The known chain guide (fixed guide) 600 has the structure similar to that of the chain guide (pivoting guide) 500 except that two fixed boss portions to be fixed to the two mounting shafts Q are provided instead of the pivoting boss portion 523 and the pressed portion 524 of the above-described chain guide 500, and has almost all of its structure on the side opposite to the chain travel surface (in the example of FIG. 5, on the outer peripheral side of the timing chain CH in the engine room E).

In the known chain guide described above, in order to secure the rigidity and durability of the chain guide, although it is necessary to increase the size of the guide body to improve the rigidity and durability thereof, since the known chain guide has almost all of the structure on the side opposite to the chain travel surface, in a case where the timing chain CH is guided from the outer peripheral side of the timing chain CH in the engine room E as shown in the example of FIG. 5, there has been a problem that it is not possible to enlarge the guide body to the inner peripheral side and a space needs to be secured on the outer peripheral side, which makes it difficult to design the engine room E compactly.

In addition, since the lips protruding to the side of the chain are provided at both sides of the guide shoe in the width direction for preventing the detachment of the chain in the width direction, it is necessary to increase the size of the guide shoe. However, since it is necessary to use an expensive material optimum for sliding for the guide shoe, there has been a problem that its cost is increased.

With regard to this point, for example, like Japanese Patent Application Laid-open No. 2009-85412, a technique that can reduce the size of the guide shoe by separately providing a guide wall on the outside of the guide shoe is known. However, there has been a problem that the number of components is increased and costs in assembly and maintenance are increased.

SUMMARY OF THE INVENTION

The present invention solves the above problems, and an object thereof is to provide the chain guide capable of improving the rigidity and the durability without enlarging its structure to the side opposite to the chain travel surface with a simple configuration and reducing the size of the guide shoe without increasing the number of components to thereby lower manufacturing cost.

The present invention is a chain guide including a guide shoe that slidably guides a traveling chain, and a guide body that supports the guide shoe along a direction of travel of the chain, wherein the guide body has support wall portion(s) provided near at least one side of both sides of the guide shoe in a width direction, and the support wall portion(s) is/are provided so as to extend to a side of the chain from the side(s) of the guide shoe in the width direction at least at one position in the direction of travel of the chain, and the present invention thereby solves the above problems.

According to the chain guide of a first aspect, the support wall portion(s) of the guide body is/are provided so as to extend to the side of the chain from the side(s) of the guide shoe in the width direction at least at one position in the direction of travel of the chain, and it thereby becomes possible to improve rigidity and durability without enlarging its structure to the side opposite to a chain travel surface, and hence it becomes possible to reduce restriction caused by an installation space of an engine room or the like, and increase flexibility in designing devices to be used.

In addition, the parts of the support wall portion(s) extending to the side of the chain from the side(s) of the guide shoe in the width direction function as guide walls for preventing the detachment of the chain in the width direction, and hence it is not necessary to provide a protruding lip in the guide shoe, and it is possible to reduce the size of the guide shoe to thereby lower manufacturing cost.

According to the configuration of a second aspect, the support wall portion(s) is/are provided so as to extend to the side of the chain from the side(s) of the guide shoe in the width direction at least at a pressed portion, and it is thereby possible to secure a large installation space for a pressing mechanism that requires the largest space on the side opposite to the chain travel surface, and hence it becomes possible to further reduce the restriction caused by the installation space of the engine room or the like, and further increase the flexibility in designing devices to be used.

In addition, it is possible to reduce the distance between the pressed portion and the guide shoe, and hence an oil that causes the pressing mechanism to operate flows out from a position close to the guide shoe and the supply amount of the oil to the chain travel surface of the guide shoe that slides relative to the chain is increased so that it becomes possible to effectively cool the guide shoe and suppress the wear of the chain travel surface.

According to the configuration of a third aspect, the support wall portion(s) is/are provided so as to extend only to a side opposite to the chain from the side(s) of the guide shoe in the width direction at least in the vicinity of a pivoting boss portion, and it is thereby possible to form the pivoting boss portion at a position spaced from the chain travel surface of the guide shoe by a predetermined distance, and hence it is possible to reduce heat conducted from the chain travel surface to the pivoting boss portion to prevent the deformation of the pivoting boss portion by the heat, the enlargement of a gap with a pivot, and the generation of vibrations or the like.

Further, the support wall portion(s) is/are provided so as to extend to both of the side of the chain and the side opposite to the chain from the side(s) of the guide shoe in the width direction at a predetermined position between the pivoting boss portion and the pressed portion in the direction of travel of the chain, and it is thereby possible to secure the necessary and sufficient width of each of the support wall portion(s) from the pivoting boss portion to the pressed portion, and hence it becomes possible to reduce the restriction caused by the installation space of the engine room or the like while sufficiently securing the rigidity and the durability, and increase the flexibility in designing devices to be used.

According to the configuration of a fourth aspect, the support wall portion(s) is/are provided so as to extend to the side of the chain from the side(s) of the guide shoe in the width direction at an intermediated portion of fixed boss portions at two positions, and it thereby becomes possible to reduce the space on the side opposite to the chain travel surface and secure the rigidity and the durability in the chain guide provided fixedly, and hence it is possible to reduce the installation space of the engine room or the like, and increase the flexibility in designing devices to be used.

In addition, the parts of the support wall portion(s) extending to the side of the chain from the side(s) of the guide shoe in the width direction function as the guide walls for preventing the detachment of the chain in the width direction, and hence it is not necessary to provide the protruding lip in the guide shoe, and it is possible to reduce the size of the guide shoe to thereby lower manufacturing cost.

According to the configuration of a fifth aspect, the support wall portion(s) is/are provided so as to extend only to the side opposite to the chain from the side(s) of the guide shoe in the width direction at least in the vicinity of each of the fixed boss portions, and it is thereby possible to form the fixed boss portion at a position spaced from the chain travel surface of the guide shoe by a predetermined distance, and hence it is possible to reduce heat conducted from the chain travel surface to the fixed boss portion to prevent the deformation of the fixed boss portion by the heat, the enlargement of a gap with amounting shaft, and the generation of vibrations or the like.

Further, the support wall portion(s) is/are provided so as to extend to both of the side of the chain and the side opposite to the chain from the side(s) of the guide shoe in the width direction between the fixed boss portion and the intermediate portion in the direction of travel of the chain, and it is thereby possible to secure the necessary and sufficient width of each of the support wall portion(s) over the entire length, and hence it becomes possible to reduce the installation space of the engine room or the like while sufficiently securing the rigidity and the durability, and increase the flexibility in designing devices to be used.

According to the configuration of a sixth aspect, it becomes possible to reinforce the support wall portion(s) so that it becomes possible to further improve the rigidity and the durability.

BRIEF DESCRIPTION OF THE DRAWINGS

FIG. 2B is a cross-sectional view of a conventional example at the position similar to that of FIG. 2A;

DESCRIPTION OF THE PREFERRED EMBODIMENTS

The present invention is a chain guide including a guide shoe that slidably guides a traveling chain and a guide body that supports the guide shoe along the direction of travel of the chain, and the specific configuration of the chain guide may be any configuration as long as the guide body has support wall portions provided near at least one side of both sides of the guide shoe in a width direction, the support wall portions are provided so as to extend to the side of the chain from the side(s) of the guide shoe in the width direction at least at one position in the direction of travel of the chain, and it is possible to improve rigidity and durability without enlarging its structure to the side opposite to a chain travel surface with a simple configuration and reduce the size of the guide shoe without increasing the number of components to thereby lower manufacturing cost.

The guide body and the guide shoe may be formed separately or integrally and, as the material therefor, an appropriate known material may be selected according to rigidity, sliding characteristics, moldability, and cost.

First Embodiment

A description will be given of a chain guide (pivoting guide) 100 according to a first embodiment of the present invention based on the drawings.

Figure 1:
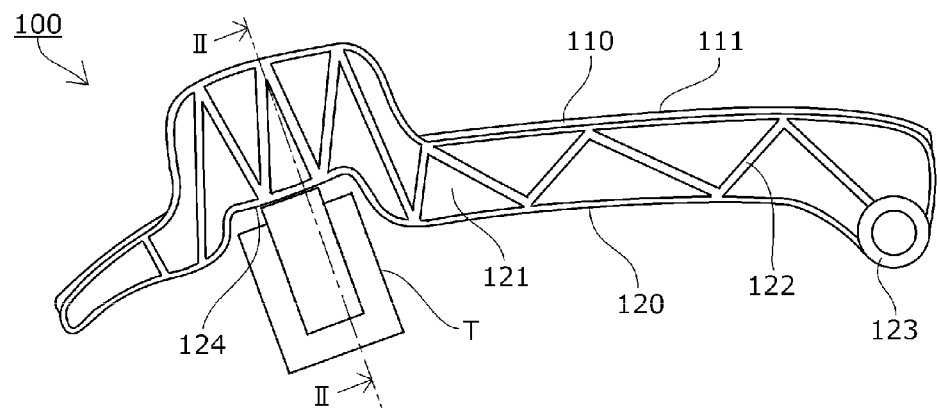
FIG. 1 is a side view of a chain guide (pivoting guide) according to a first embodiment of the present invention.
Figure 2A:
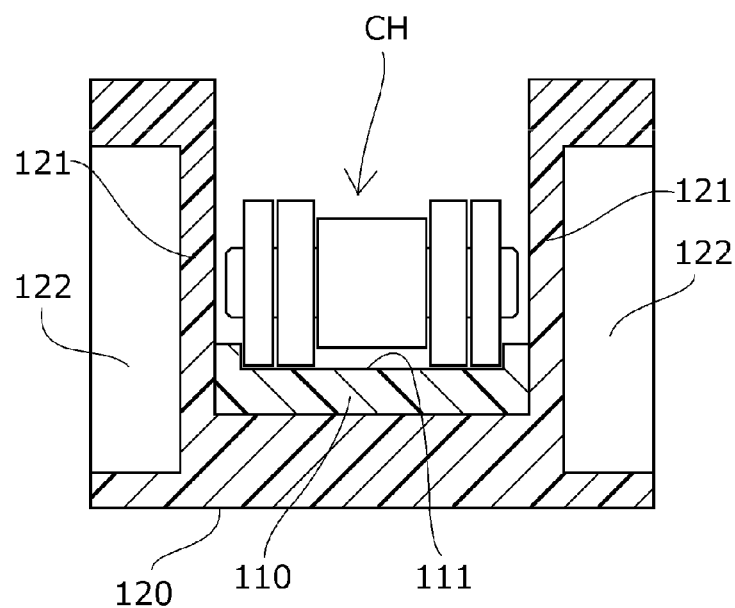
FIG. 2A is a cross-sectional view taken along the line II-II of FIG. 1.

The chain guide 100 according to the first embodiment of the present invention is pivotably supported in an engine having a timing system, guides and stabilizes the travel of a timing chain CH, is pressed to the side of the chain by a tensioner T to properly maintain tension and, as shown in FIGS. 1 and 2A, includes a guide shoe 110 and a guide body 120.

The guide body 120 has a pivoting boss portion 123 that is pivotably supported via support wall portions 121, and a pressed portion 124 that is pressed to the side of the chain by the tensioner T.

The support wall portions 121 are provided so as to be positioned at both sides of the guide shoe 110 in a width direction, and the support wall portions 121 are provided so as to extend to the side of the chain from the both sides of the guide shoe 110 in the width direction in the vicinity of the pressed portion 124, and extend to the side opposite to the chain from the both sides of the guide shoe 110 in the width direction from the pivoting boss portion 123 to the vicinity of the pressed portion 124 and in the vicinity of a tip portion.

In addition, between the position where the support wall portions 121 extend to the side of the chain and the position where the support wall portions 121 extend to the side opposite to the chain, the support wall portions 121 are provided so as to extend to both of the side of the chain and the side opposite to the chain from the both sides of the guide shoe 110 in the width direction, and are continuously formed so as to maintain the widths that satisfy the rigidity and durability of the guide body 120.

Further, a reinforcing rib 122 is provided on the outside of the support wall portion 121, and the rigidity of the guide body 120 is thereby enhanced.

The parts of the support wall portions 121 that extend to the side of the chain from the both sides of the guide shoe 110 in the width direction are present at the positions of the lips 512 provided in the known guide shoe 510 shown in FIG. 2B, and, similarly to the lips, function as guides for preventing the detachment of the timing chain CH in the width direction.

Consequently, similarly to the known guide shoe, although stepped portions for guiding the plate of the timing chain CH are provided on both sides of a chain travel surface 111 as shown in FIG. 2A, the lip is not provided over the entire length in the direction of travel of the chain in the guide shoe 110.

According to the chain guide 100 of the present embodiment configured as described above, it is possible to reduce the width of the guide shoe 110 and omitting the lip to thereby lower manufacturing cost.

In addition, the support wall portions 121 are provided so as to extend to the side of the chain from the both sides of the guide shoe 110 in the width direction in the vicinity of the pressed portion 124 and, as shown in FIGS. 2A and 2B, it is thereby possible to secure a large installation space for the chain tensioner T that requires the largest space on the side opposite to the chain travel surface 111 as compared with the conventional chain guide 500, and reduce restriction caused by the installation space of the engine room.

Further, the support wall portions 121 are provided so as to extend only to the side opposite to the chain from the both sides of the guide shoe 110 in the width direction in the vicinity of the pivoting boss portion 123, and it is thereby possible to form the pivoting boss portion 123 at a position spaced from the chain travel surface 111 of the guide shoe 110 by a predetermined distance similarly to the known chain guide, and reduce heat conducted from the chain travel surface 111 to the pivoting boss portion 123 to prevent the deformation of the pivoting boss portion 123 by the heat, the enlargement of a gap with the pivot, and the generation of vibrations or the like.

Furthermore, the distance between the pressed portion 124 and the guide shoe 110 is reduced, an oil that causes the chain tensioner T to operate flows out from a position close to the guide shoe 110, and the supply amount of the oil in the direction of the chain travel surface 111 is increased so that it is possible to effectively cool the guide shoe 110 and suppress the wear of the chain travel surface 111.

Second Embodiment

A description will be given of a chain guide (fixed guide) 200 according to a second embodiment of the present invention based on the drawings.

Figure 3:
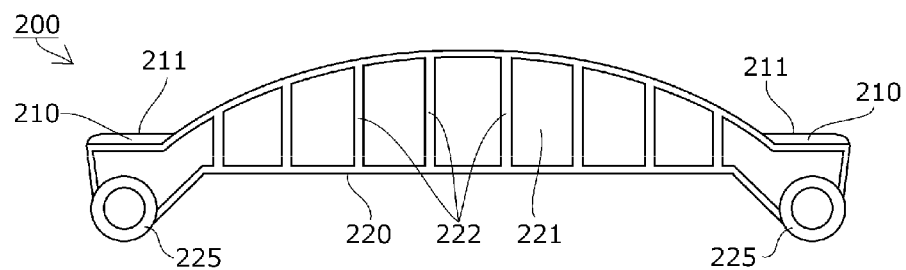
FIG. 3 is a side view of a chain guide (fixed guide) according to a second embodiment of the present invention.

The chain guide 200 according to the second embodiment of the present invention is fixed in the engine having the timing system, guides and stabilizes the travel of the timing chain CH and, as shown in FIG. 3, includes a guide shoe 210 and a guide body 220.

The guide body 220 has fixed boss portions 225 that are provided at two positions and fixed in the engine via support wall portions 221.

The support wall portions 221 are provided so as to be positioned at both sides of the guide shoe 210 in the width direction. The support wall portions 221 are provided so as to extend to the side of the chain from the both sides of the guide shoe 210 in the width direction at the intermediate portion of the fixed boss portions 225 provided at two positions, and are provided so as to extend to the side opposite to the chain from the both sides of the guide shoe 210 in the width direction in the vicinity of each of the fixed boss portions 225 at two positions.

In addition, a reinforcing rib 222 is provided on the outside of the support wall portion 221, and the rigidity of the guide body 220 is thereby enhanced.

Similarly to the above-described first embodiment, the parts of the support wall portions 221 extending to the side of the chain from the both sides of the guide shoe 210 in the width direction function as guides for preventing the detachment of the timing chain CH in the width direction, and hence, similarly to the above-described first embodiment, the lip is not provided over the entire length in the direction of travel of the chain in the guide shoe 210.

Figure 4:
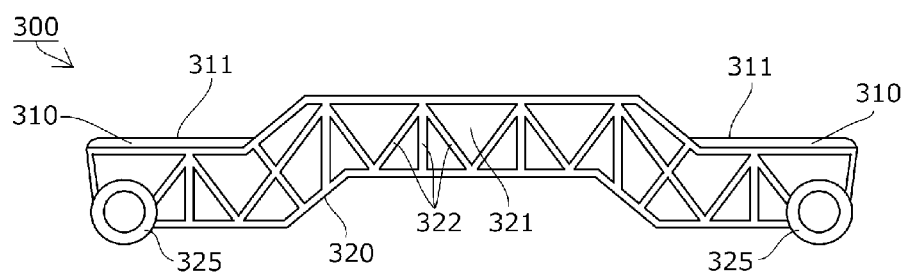
FIG. 4 is a side view of the chain guide (fixed guide) according to a modification of the second embodiment of the present invention.
Figure 5:
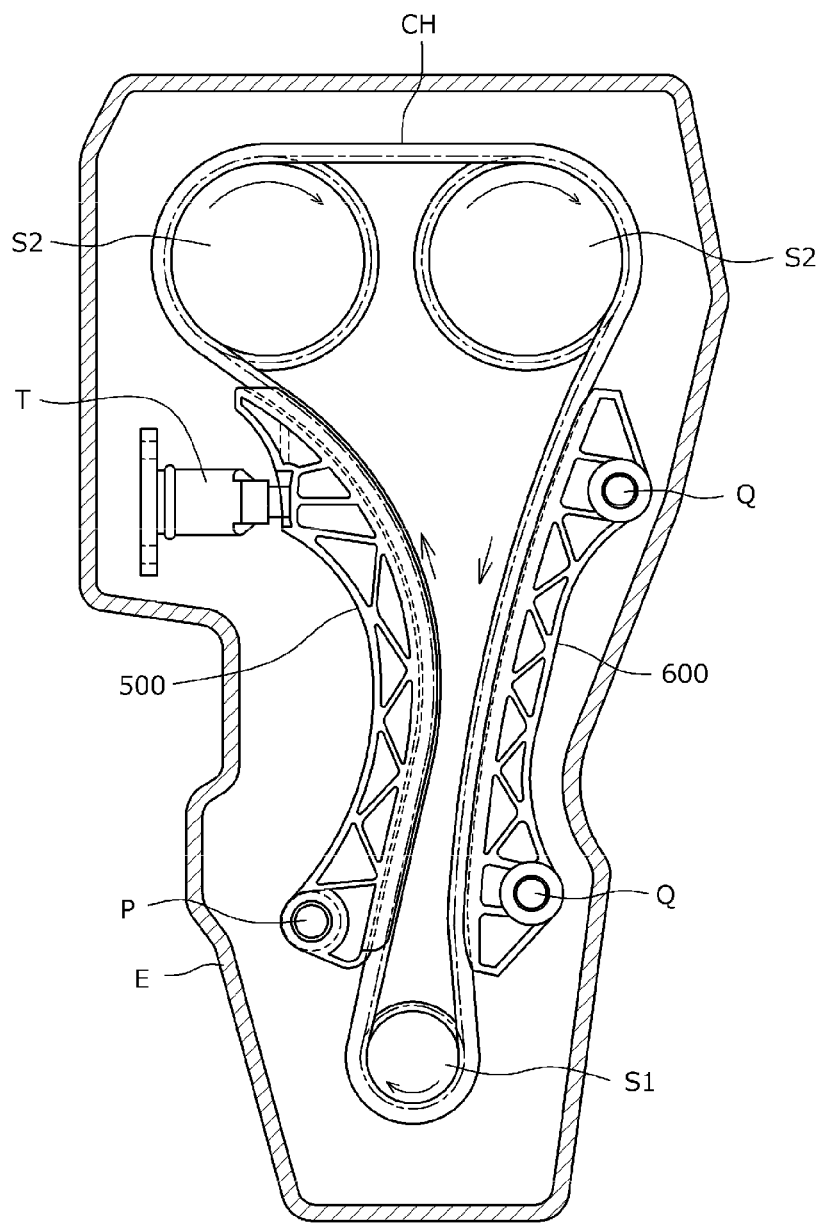
FIG. 5 is an explanatory view of a conventional timing system of an engine.
Figure 6:
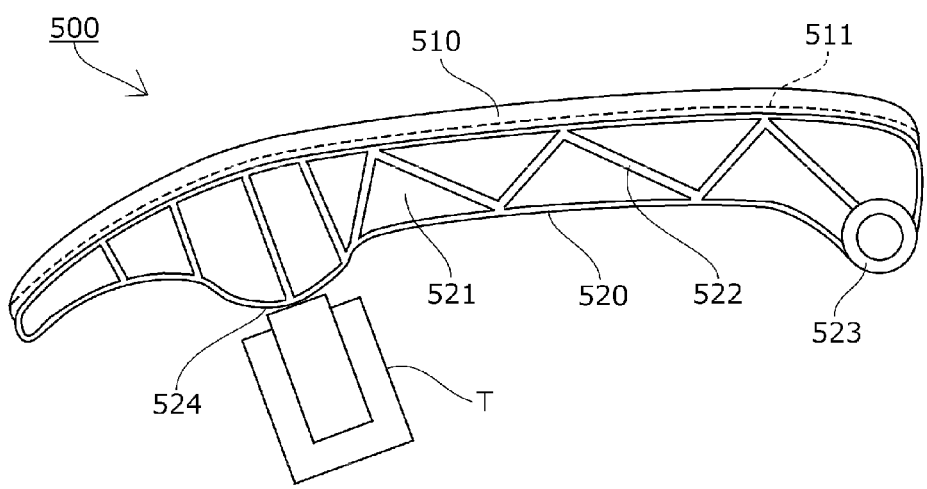
FIG. 6 is a side view of a conventional chain guide (pivoting guide)
Figure 7:
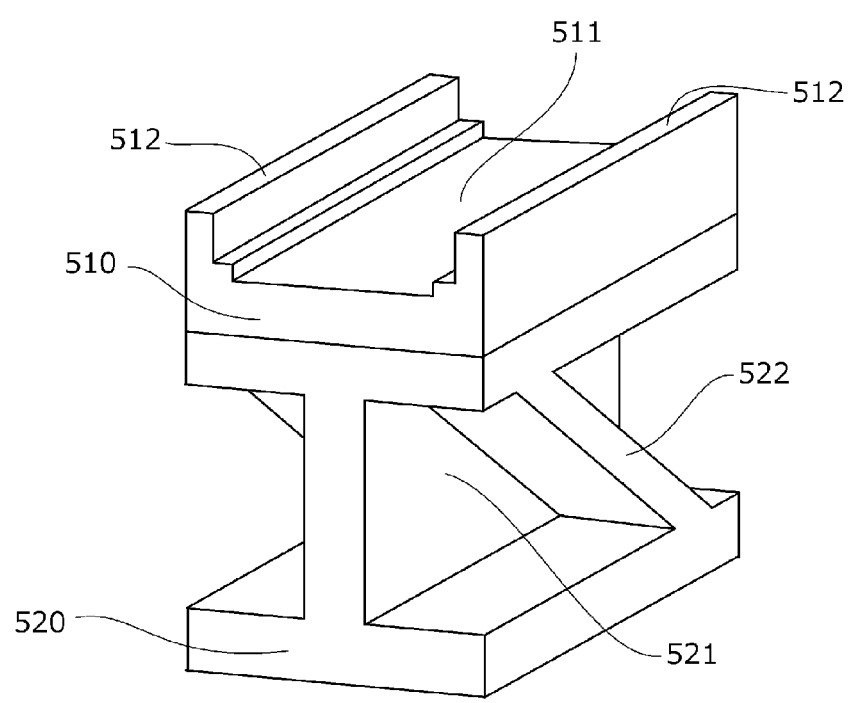
FIG. 7 is a schematic cross-sectional perspective view of the conventional chain guide.

FIG. 4 shows a chain guide 300 according to a modification of the second embodiment of the present invention.

In the present modification, support wall portions 321 are provided so as to extend to the side opposite to the chain from both sides of a guide shoe 310 in the width direction up to predetermined positions in the vicinities of fixed boss portions 325 that are provided at two positions, are provided so as to extend to the side of the chain from the both sides of the guide shoe 310 in the width direction at the intermediate portion, are provided so as to extend to both of the side of the chain and the side opposite to the chain from the both sides of the guide shoe 310 in the width direction between the position where the support wall portions 321 extend to the side of the chain and the position where the support wall portions 321 extend to the side opposite to the chain, and are continuously formed so as to maintain the widths that satisfy the rigidity and durability of a guide body 320.

The configuration of the chain guide 300 is otherwise the same as that of the chain guide 200 according to the above-described second embodiment though the specific shape thereof or the like is different from that of the chain guide 200.

According to the chain guides 200 and 300 of the present embodiment and its modification configured as described above, it is possible to reduce the width of each of the guide shoes 210 and 310 and omit the lip to thereby lower manufacturing cost.

In addition, the support wall portions 221 and 321 are provided so as to extend to the side of the chain from the both sides of the guide shoes 210 and 310 in the width direction at the intermediate portions of the fixed boss portions 225 and 325, and it is thereby possible to secure a large space and reduce the restriction caused by the installation space of the engine room.

For example, it becomes possible to use the chain guide in the engine in which a metal chain guide having high rigidity has to be used conventionally due to a limited space on the outer peripheral side of the timing chain.

Further, the support wall portions 221 and 321 are provided so as to extend only to the side opposite to the chain from the both sides of the guide shoes 210 and 310 in the width direction in the vicinities of the fixed boss portions 225 and 325, and it is thereby possible to form the fixed boss portions 225 and 325 at positions spaced from the chain travel surfaces 211 and 311 of the guide shoes 210 and 310 by predetermined distances similarly to the known chain guide, and reduce heat transmitted from the chain travel surfaces 211 and 311 to the fixed boss portions 225 and 325 to prevent the deformation of the fixed boss portions 225 and 525 by the heat, the enlargement of the gaps with the mounting shafts, and the generation of vibrations or the like.

Although each of the embodiments described above is the specific example of the chain guide according to the present invention, the chain guide according to the present invention is not limited thereto, and various changes and modifications of the shapes, positions, dimensions, and dispositions of the individual constituent members can be made.

For example, in each of the embodiments, although the lip is not provided over the entire length of each of the guide shoes 110, 210, and 310, the lip may also be provided at the position where the support wall portion 121 extends only to the side opposite to the chain.

In addition, in each of the embodiments, although support wall portions 121, 221, and 321 are provided at both sides of the guide shoe 110, 210, and 310, support wall portions 121, 221, and 321 may be provided at only one side of both sides of the guide shoe 110, 210, and 321, for example, if there is obstacle on a mounted object such as an engine block.

In addition, in each of the embodiments described above, although the chain guide is provided in the engine having the timing system, the use of the chain guide is not limited to the use in the engine, and the chain guide can be used in various equipment.

Further, the use of the chain guide is not limited to the use in a transmission mechanism using the chain, and the chain guide may be used in similar transmission mechanisms using a belt, a rope, and the like, and can be used in various industrial fields.

What is claimed is:

1. A chain guide comprising:
a guide shoe that slidably guides a traveling chain; and
a guide body that supports the guide shoe along a direction of travel of the chain,
wherein the guide body has a pivoting boss portion configured to be pivotably supported and a pressed portion configured to be pressed to a side of the chain by a pressing mechanism,
wherein the guide body has support wall portion(s) provided near at least one side of both sides of the guide shoe in a width direction thereof,
wherein, at the pressed portion, the support wall portion(s) is/are provided so as to extend to both the side of the chain and a side opposite to the chain, from the side(s) of the guide shoe in the width direction, and
wherein, at the pressed portion, reinforcing rib(s) is/are continuously provided on a region of the support wall portion(s) which extends to the side of the chain and a region of the support wall portion(s) which extends to the side opposite to the chain.

2. The chain guide according to claim 1, wherein
the support wall portion(s) is/are provided so as to extend only to the side opposite to the chain from the side(s) of the guide shoe in the width direction at least in a vicinity of the pivoting boss portion, and
the support wall portion(s) is/are provided so as to extend to both of the side of the chain and the side opposite to the chain from the side(s) of the guide shoe in the width direction at a predetermined position between the pivoting boss portion and the pressed portion, in the direction of travel of the chain.

* * * * *